(12) United States Patent
Rivera

(10) Patent No.: US 11,013,364 B2
(45) Date of Patent: *May 25, 2021

(54) BREWING CARTRIDGE ADAPTER

(71) Applicant: Adrian Rivera, Whittier, CA (US)

(72) Inventor: Adrian Rivera, Whittier, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,916

(22) Filed: Apr. 15, 2019

(65) Prior Publication Data

US 2020/0107670 A1    Apr. 9, 2020

Related U.S. Application Data

(63) Continuation-in-part of application No. 14/531,729, filed on Nov. 3, 2014, now Pat. No. 10,258,186, which is a continuation-in-part of application No. 13/757,026, filed on Feb. 1, 2013, now Pat. No. 8,967,038.

(60) Provisional application No. 61/898,886, filed on Nov. 1, 2013.

(51) Int. Cl.
*A47J 31/06* (2006.01)
*A47J 31/40* (2006.01)

(52) U.S. Cl.
CPC .................. *A47J 31/407* (2013.01)

(58) Field of Classification Search
CPC ................ A47J 31/0668; A47J 31/0673; A47J 31/0689; A47J 31/3695
See application file for complete search history.

(56) References Cited

U.S. PATENT DOCUMENTS

| | | |
|---|---|---|
| 2,433,815 A | 12/1947 | Laforge |
| 3,022,411 A | 2/1962 | Soper et al. |
| 3,115,822 A | 12/1963 | Totten |
| 3,120,170 A | 2/1964 | Garte |
| 3,136,241 A | 6/1964 | Price |
| 3,199,682 A | 8/1965 | Scholtz |
| 3,224,360 A | 12/1965 | Wickenberg et al. |
| 3,316,388 A | 4/1967 | Wickenberg et al. |
| 3,384,004 A | 5/1968 | Perlman et al. |
| 3,405,630 A | 10/1968 | Weber, III |
| 3,583,308 A | 6/1971 | Williams |
| 3,607,297 A | 9/1971 | Fasano |

(Continued)

FOREIGN PATENT DOCUMENTS

WO    2005092160 A1    10/2005

*Primary Examiner* — Robert J Utama
*Assistant Examiner* — Lawrence H Samuels
(74) *Attorney, Agent, or Firm* — IP Strategies

(57) ABSTRACT

A brewing cartridge adapter includes a base, a passage wall, and an entry port. The base includes a floor, and a base wall extending from the floor and having an outer edge opposite the floor, defining an enclosed interior. The passage wall is arranged outside the wall and defines an enclosed extraction passage. The passage wall is closed at a bottom and extends to an outlet port proximal to the outer edge. The entry port is arranged between the extraction passage and the interior. The extraction passage is arranged in fluid communication with the interior through the entry port, and in fluid communication with an exterior of the base through the outlet port. At least a portion of the extraction passage is separated from the interior by the wall at the outer edge of the wall. The outlet port is arranged in a plane defined by the outer edge.

10 Claims, 10 Drawing Sheets

(56) References Cited

U.S. PATENT DOCUMENTS

| | | | |
|---|---|---|---|
| 3,757,670 | A | 9/1973 | Laama et al. |
| 3,844,206 | A | 10/1974 | Weber |
| 3,958,502 | A | 5/1976 | Vitous |
| 4,253,385 | A | 3/1981 | Illy |
| 4,286,515 | A | 9/1981 | Baumann et al. |
| 4,603,621 | A | 8/1986 | Roberts |
| 4,703,687 | A | 11/1987 | Wei |
| 4,800,089 | A | 1/1989 | Scott |
| 4,998,463 | A | 3/1991 | Precht et al. |
| 5,000,082 | A | 3/1991 | Lassota |
| 5,012,629 | A | 5/1991 | Rehman et al. |
| 5,046,409 | A | 9/1991 | Henn |
| 5,123,335 | A | 6/1992 | Aselu |
| 5,171,457 | A | 12/1992 | Acuff et al. |
| 5,233,914 | A | 8/1993 | English |
| 5,325,765 | A * | 7/1994 | Sylvan ................ A47J 31/0673 426/433 |
| 5,335,589 | A | 8/1994 | Yerves, Jr. et al. |
| 5,526,733 | A | 6/1996 | Klawuhn et al. |
| 5,582,730 | A | 12/1996 | Hugentobler |
| 5,636,563 | A | 6/1997 | Oppermann et al. |
| 5,649,412 | A | 7/1997 | Binacchi |
| 5,676,041 | A | 10/1997 | Glucksman et al. |
| 5,829,340 | A | 11/1998 | Yang |
| 5,840,189 | A | 11/1998 | Sylvan et al. |
| 5,870,943 | A | 2/1999 | Levi et al. |
| 5,895,672 | A | 4/1999 | Cooper |
| 6,136,352 | A | 10/2000 | Silverstein et al. |
| 6,189,438 | B1 | 2/2001 | Bielfeldt et al. |
| D454,433 | S | 3/2002 | Peter |
| D454,434 | S | 3/2002 | McDaniel et al. |
| 6,440,256 | B1 | 8/2002 | Gordon et al. |
| D474,110 | S | 5/2003 | Sweeney |
| D474,111 | S | 5/2003 | Lazaris |
| 6,589,577 | B2 | 7/2003 | Lazaris et al. |
| 6,606,938 | B2 | 8/2003 | Taylor |
| 6,607,762 | B2 * | 8/2003 | Lazaris .............. B65D 85/8043 206/5 |
| 6,645,537 | B2 | 11/2003 | Sweeney et al. |
| 6,658,989 | B2 | 12/2003 | Sweeney et al. |
| 6,708,600 | B2 * | 3/2004 | Winkler .............. A47J 31/3695 99/295 |
| 6,727,484 | B2 | 4/2004 | Policappelli |
| 6,740,345 | B2 | 5/2004 | Cai |
| 6,777,007 | B2 | 8/2004 | Cai |
| 6,832,542 | B2 | 12/2004 | Hu et al. |
| 6,843,165 | B2 | 1/2005 | Stoner |
| D502,362 | S | 3/2005 | Lazaris et al. |
| 6,904,840 | B1 | 6/2005 | Pfeifer et al. |
| 6,948,420 | B2 | 9/2005 | Kirschner et al. |
| 7,047,870 | B2 | 5/2006 | Gantt et al. |
| 7,081,263 | B2 | 7/2006 | Albrecht |
| 7,131,369 | B2 | 11/2006 | Gantt et al. |
| 7,320,274 | B2 | 1/2008 | Castellani |
| 7,377,089 | B2 | 5/2008 | Rapparini |
| 7,946,217 | B2 | 5/2011 | Favre et al. |
| 3,047,127 | A1 | 11/2011 | Lin |
| 8,047,126 | B2 | 11/2011 | Doglioni Majer |
| 8,291,812 | B2 | 10/2012 | Rivera |
| 8,539,876 | B2 * | 9/2013 | Webster ................ A47J 31/02 99/316 |
| 8,720,320 | B1 * | 5/2014 | Rivera ................ A47J 31/3695 99/295 |
| 8,967,038 | B2 * | 3/2015 | Rivera .............. B65D 85/8043 99/295 |
| 8,986,764 | B2 * | 3/2015 | Yoakim ................ A23F 5/262 426/115 |
| 9,232,871 | B2 * | 1/2016 | Rivera .............. B65D 85/8043 |
| 9,486,108 | B1 | 11/2016 | Douglas et al. |
| 10,258,186 | B2 * | 4/2019 | Rivera .............. B65D 85/8043 |
| 2002/0035929 | A1 | 3/2002 | Kanba et al. |
| 2002/0148356 | A1 | 10/2002 | Lazaris et al. |
| 2003/0200872 | A1 | 10/2003 | Lin |
| 2004/0005384 | A1 | 1/2004 | Cai |
| 2004/0118290 | A1 | 6/2004 | Cai |
| 2004/0163543 | A1 | 8/2004 | Hu et al. |
| 2005/0166763 | A1 | 8/2005 | Scarchilli et al. |
| 2005/0236323 | A1 | 10/2005 | Oliver et al. |
| 2005/0257695 | A1 | 11/2005 | Dobranski et al. |
| 2006/0159815 | A1 | 7/2006 | Crook et al. |
| 2006/0174769 | A1 | 8/2006 | Favre et al. |
| 2006/0196364 | A1 | 9/2006 | Kirschner |
| 2007/0259074 | A1 | 11/2007 | Searchilli et al. |
| 2009/0155422 | A1 | 6/2009 | Ozanne |
| 2009/0229471 | A1 | 9/2009 | Lun et al. |
| 2010/0083843 | A1 | 4/2010 | Denisart et al. |
| 2010/0288131 | A1 | 11/2010 | Kilber et al. |
| 2010/0303964 | A1 | 12/2010 | Beaulieu et al. |
| 2011/0151075 | A1 | 6/2011 | Peterson |
| 2011/0209623 | A1 | 9/2011 | Leung et al. |
| 2011/0274802 | A1 * | 11/2011 | Rivera ................ A47J 31/0689 426/431 |
| 2012/0058226 | A1 | 3/2012 | Winkler et al. |
| 2012/0207895 | A1 | 8/2012 | Rivera |
| 2012/0207896 | A1 * | 8/2012 | Rivera ................ A47J 31/0689 426/433 |
| 2012/0276264 | A1 | 11/2012 | Rivera |
| 2012/0285330 | A1 | 11/2012 | DeMiglio et al. |
| 2012/0285334 | A1 | 11/2012 | DeMiglio et al. |
| 2012/0308688 | A1 | 12/2012 | Peterson et al. |
| 2014/0245895 | A1 | 9/2014 | DeMiglio et al. |
| 2015/0353272 | A1 * | 12/2015 | Mariller ............. B65D 85/8043 426/112 |
| 2015/0374165 | A1 * | 12/2015 | Rivera ................ A47J 31/4403 99/300 |
| 2017/0174418 | A1 | 6/2017 | Cai |
| 2019/0225414 | A1 * | 7/2019 | McHugh .............. B65D 85/804 |

\* cited by examiner

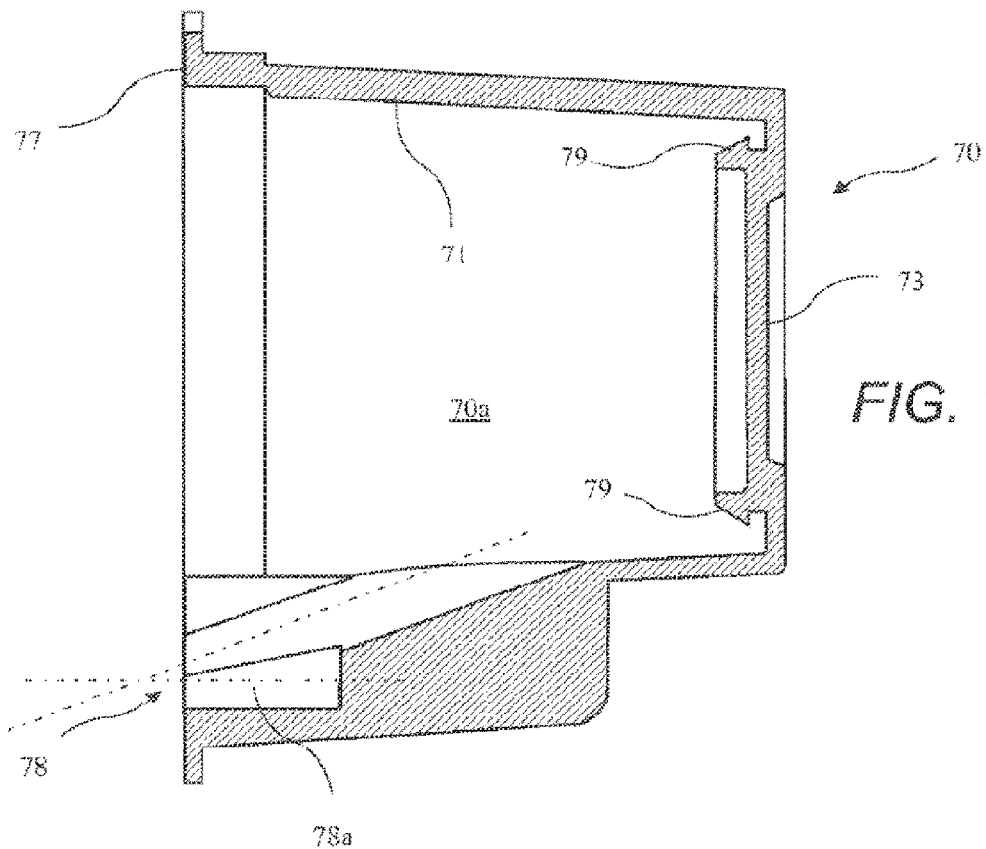
FIG. 11
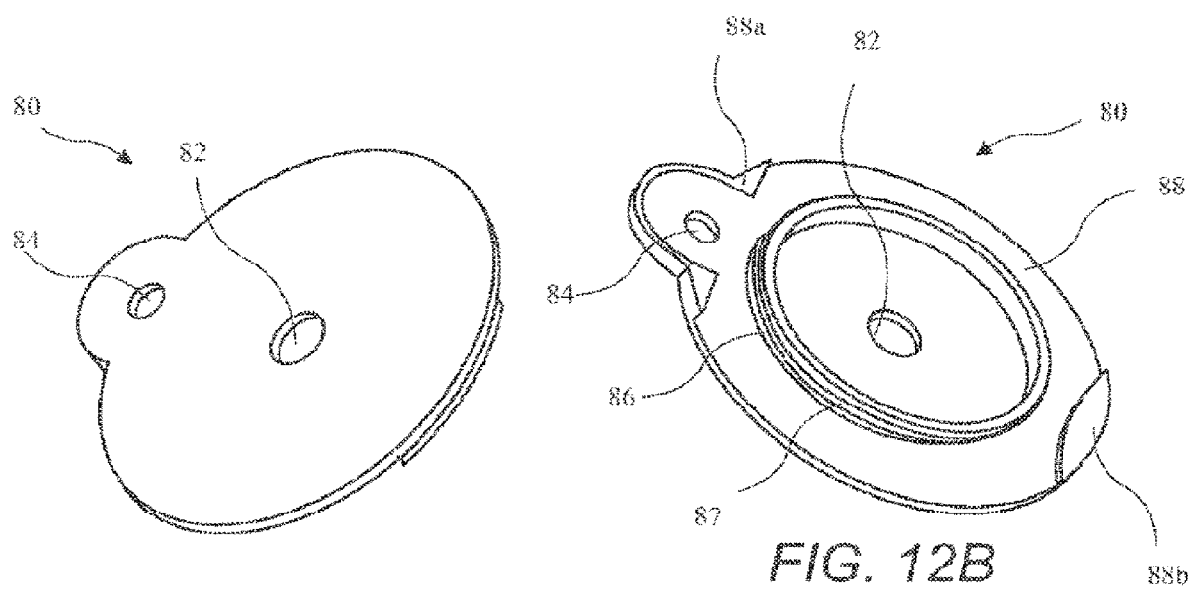
FIG. 12A
FIG. 12B

US 11,013,364 B2

BREWING CARTRIDGE ADAPTER

CROSS-REFERENCE TO RELATED APPLICATIONS

This is a continuation-in-part of U.S. patent application Ser. No. 14/531,729, which was filed on Nov. 3, 2014, which is turn claims the priority of U.S. Provisional Application for Patent Ser. No. 61/898,886, which was filed on Nov. 1, 2013, and which was a continuation-in-part of U.S. patent application Ser. No. 13/757,026, which was filed on Feb. 1, 2013, the disclosures of all of which are incorporated in their entirety herein.

FIELD OF THE INVENTION

The present invention relates to beverage brewing cartridges and in particular to an adapter for a beverage brewing cartridge for a particular beverage maker to be used in a different model of beverage maker.

BACKGROUND OF THE INVENTION

Automated beverage brewing machines are well known, and, for example, single-serving coffee makers, using a disposable or a reusable cartridge, have become very popular. Such coffee makers and similar beverage brewers are in wide use and a large variety of brewing cartridges have become available for them. Typical of such beverage brewers are those in which a disposable brewing cartridge is inserted into a brewing chamber of the brewer. An injection needle in the lid of the beverage brewer punctures a foil cover on the disposable brewing cartridge and injects liquid into the disposable brewing cartridge, which contains beverage brewing material, typically ground beverage material. An extraction needle in the base of the brewing chamber punctures a base of the disposable brewing cartridges and receives the brewed beverage from the cartridge, for delivery to a drinking cup or other container. An example of a popular single-serving beverage brewer is the coffee maker sold under the trademark KEURIG®, which uses a single-serving disposable brewing cartridge sold under the trademark K-CUP®.

Reusable cartridges have also been developed for the KEURIG® single-serving coffee maker and other beverage brewers. The reusable cartridges typically include a permanent opening in a lid of the reusable cartridge to receive the injection needle, and are designed to avoid being punctured by the extraction needle. The sides and/or bottom of the reusable cartridge include passages allowing brewed drink to flow from the reusable cartridge into the brewing chamber of the beverage brewer and then into a cup below the brewing chamber. The reusable cartridge thus alters the flow of brewed beverage to avoid the extraction needle, but still works very well in the beverage brewer.

The example described above utilizes a vertical flow of liquid. That is, water is provided to the cartridge from above via the injection needle, and brewed beverage flows from the bottom of the cartridge, either via the extraction needle or via another passage in the bottom of the cartridge.

A conventional single-serving beverage brewer having a horizontal orientation receives a generally horizontal brewing cartridge. The horizontal beverage brewer includes parallel injection and extraction needles that both penetrate a foil cover of the horizontal brewing cartridge. Unfortunately, neither the single-serving disposable brewing cartridge sold under the trademark K-CUP® nor the very common disposable cartridges made for other single-serving coffee makers can be used in the horizontal beverage brewers, depriving users of cartridge selection and requiring the use of a more expensive disposable cartridge. An example of a single-serving horizontal coffee maker is the coffee maker sold under the trademark VUE®, which uses disposable horizontal brewing cartridges sold under the trademark VUE®.

A disposable or reusable beverage cartridge that could be used in a beverage brewer having a horizontal orientation, for single-serving or multiple-serving use, would be beneficial to users of the brewers.

BRIEF SUMMARY OF THE INVENTION

The present invention provides a brewing cartridge adapter that fits into known single-serving horizontally-oriented beverage brewers and allows use of a common beverage cartridge made for a vertically-oriented beverage brewer. The cartridge adapter includes a fixed extraction needle in the base of the cartridge adapter and includes walls extending from the base to guide a cartridge into position in the brewing chamber. The extraction needle pierces a cartridge to release brewed beverage into the cartridge adapter. An injection needle in the horizontally-oriented beverage brewer lid punctures a foil cover of a cartridge and passes through a permanent opening in a lid of the cartridge adapter and an extraction needle in the beverage brewer cooperates with the cartridge adapter to carry brewed drink from the cartridge adapter. Reusable cartridges including permanent openings to receive the injection needle and to release brewed beverage can also be used with the cartridge adapter.

According to an aspect of the invention, a brewing cartridge adapter for use in a beverage brewer includes a base, a passage wall, and an entry port. The base includes a floor, and a base wall extending from the floor and having an outer edge opposite the floor. The floor, base wall, and outer edge define an enclosed interior of the base. The passage wall is arranged outside the base wall and defines an enclosed extraction passage. The passage wall is closed at a bottom and extends to a permanently open outlet port proximal to the outer edge of the wall. The entry port is arranged between the extraction passage and the base interior. The extraction passage is arranged in fluid communication with the base interior through the entry port, and in fluid communication with an exterior of the base through the outlet port. At least a portion of the extraction passage is separated from the base interior by the base wall at the outer edge of the base wall. The outlet port is arranged in a plane P defined by the outer edge of the base wall.

The brewing cartridge adapter can also include a hollow adapter extraction needle configured to be coupled in the floor of the base in fluid communication with the extraction passage such that the adapter extraction needle extends from the floor into the base interior, wherein the extraction needle includes a side passage providing fluid communication between an interior of the extraction needle and the extraction passage. The base can include a shelf at the outer edge configured to support a rim of a brewing cartridge, and the adapter extraction needle can be configured to puncture the brewing cartridge.

The base can be configured to receive a brewing cartridge having a top diameter of about 1.8 inches, a height of about 1¾ inches, and a bottom diameter of about 1.45 inches.

The base wall can be frustoconical in shape.

The brewing cartridge adapter can also include a lid that is removably couplable to the base. The lid can be composed of a disposable material, in which case the lid can be attached to the base by an adhesive. The lid can be composed of a reusable material, in which case the lid is couplable to the base by mechanical cooperation of the lid and base.

BRIEF DESCRIPTION OF THE DRAWINGS

FIG. 11 is a cross-sectional view of an exemplary holder base of the reusable brewing material holder according to the present invention taken along line 11-11 of FIG. 10B.

FIG. 12A is a perspective top view of an exemplary holder lid for the reusable brewing material holder according to the present invention.

FIG. 12B is a perspective bottom view of an exemplary holder lid for the reusable brewing material holder according to the present invention.

Corresponding reference characters indicate corresponding components throughout the several views of the drawings.

DETAILED DESCRIPTION OF THE INVENTION

Figure 1A:
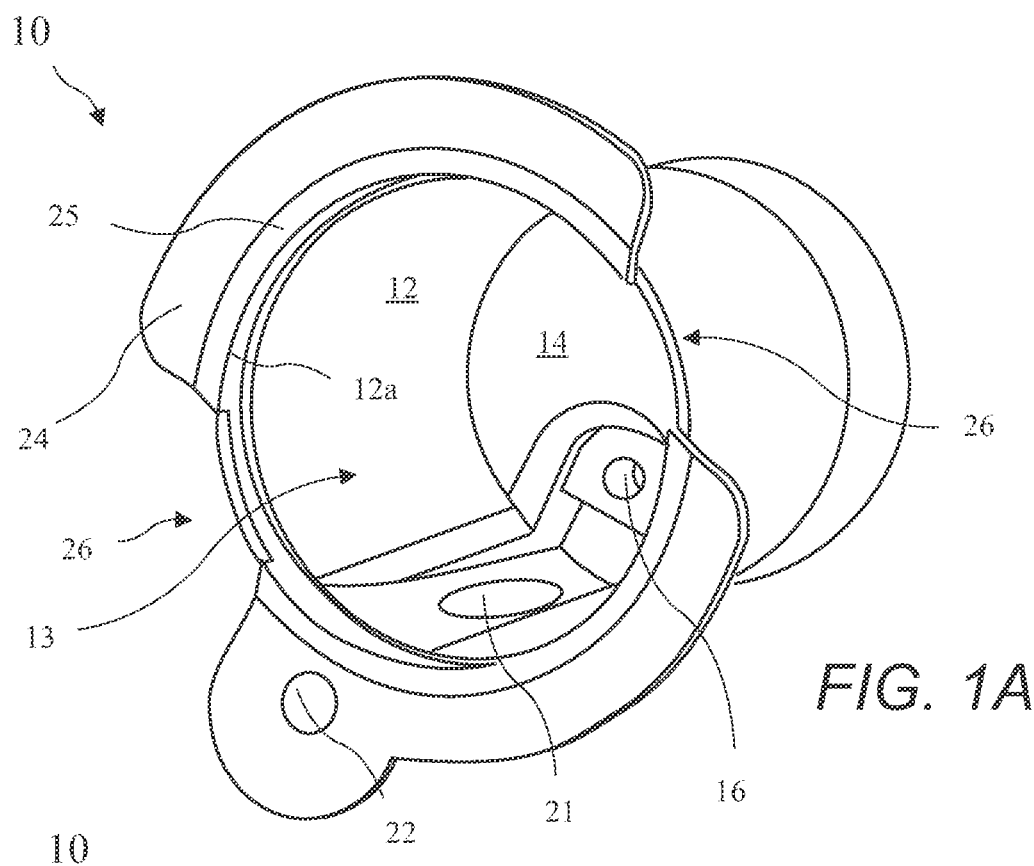
FIG. 1A is a top perspective view of an exemplary brewing cartridge adapter according to the present invention before installation of an extraction needle.
Figure 1B:
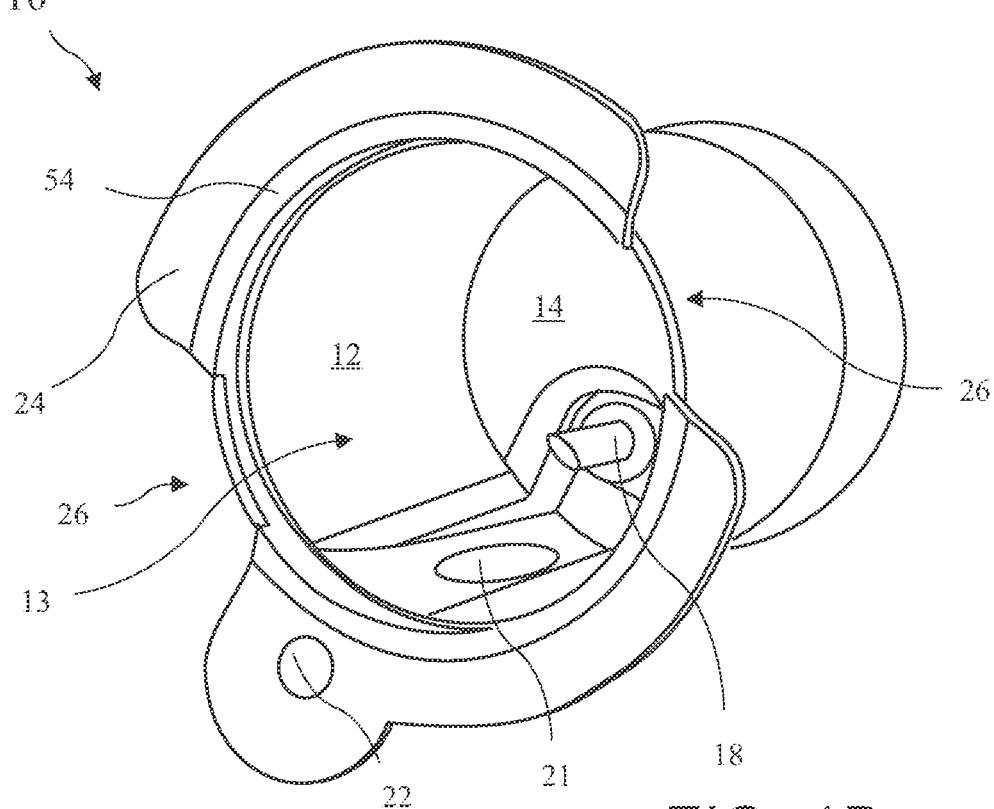
FIG. 1B is a top perspective view of an exemplary brewing cartridge adapter according to the present invention after installation of the extraction needle.

A top perspective view of a brewing cartridge adapter 10 according to the present invention, before installation of an adapter extraction needle 18, is shown in FIG. 1A, and a top perspective view of the brewing cartridge adapter 10 after installation of the extraction needle 18 is shown in FIG. 1B. The adapter extraction needle 18 is positioned off-center in the floor 14 near the wall 12 of the brewing cartridge adapter 10 to avoid puncturing a filter in a disposable cartridge. The brewing cartridge adapter 10 is configured to fit into a brewing chamber of a horizontally-oriented beverage brewer configured to accept known brewing cartridges, such as those sold under the trademark VUE®, which allow the use of known single-use disposable brewing cartridges sold under the trademark K-CUP® and of reusable adapters configured for use in beverage brewers configured to accept the disposable brewing cartridges sold under the trademark K-CUP®. A single-use disposable filter cartridge sold under the trademark K-CUP® has a top edge with a diameter of about 1.8 inches, a height of about 1¾ inches, and a frustoconical shape with a base circumference smaller than the top edge. The base of the K-CUP® cartridge is generally about 1.45 inches in diameter.

The floor 14 and wall 12 extending from the floor 14 define an interior 13. An extraction needle cavity 16 arranged in the base 14 allows attachment of the adapter extraction needle 18. A passage 20 (see FIG. 3) enters the interior 13 through an entry port 21 and ends at an outlet port 22. The outlet port 22 cooperates with an existing beverage brewer extraction needle 56 (see FIG. 15) to carry brewed beverage from the cartridge adapter 10 into the horizontally-oriented beverage brewer. The brewing cartridge adapter 10 includes a partial rim 24 configured to seat in the horizontally-oriented beverage brewer. The brewing cartridge adapter 10 further includes a shelf 25 at a top edge of the wall 12 for seating a brewing cartridge 40 (see FIGS. 8A and 8B), and notches 26 to facilitate removal of the brewing cartridge 40 after making a serving of brewed beverage. The brewing cartridge 40 can be, for example, a disposable brewing cartridge sold under the trademark K-CUP®, or a reusable adapter configured for use in beverage brewers configured to accept the disposable brewing cartridges sold under the trademark K-CUP®, or any other disposable or reusable beverage cartridge configured for use in a beverage brewer, intended to provide a single serving of a beverage or multiple servings.

Figure 2:
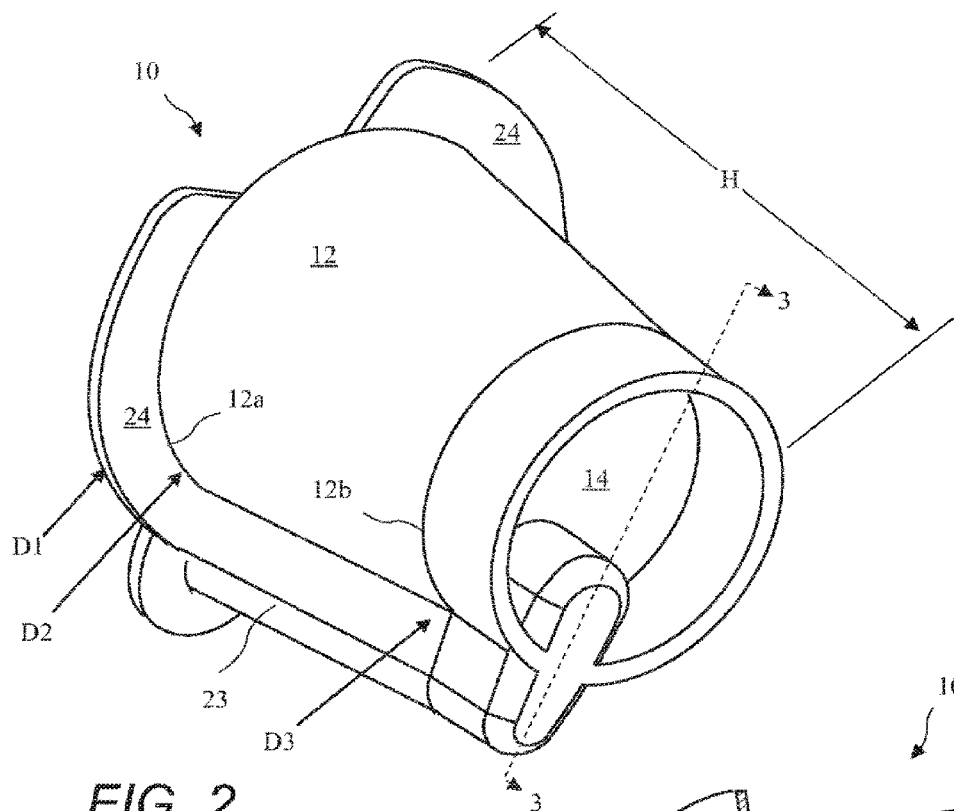
FIG. 2 is a bottom perspective view of an exemplary brewing cartridge adapter according to the present invention.
Figure 3:
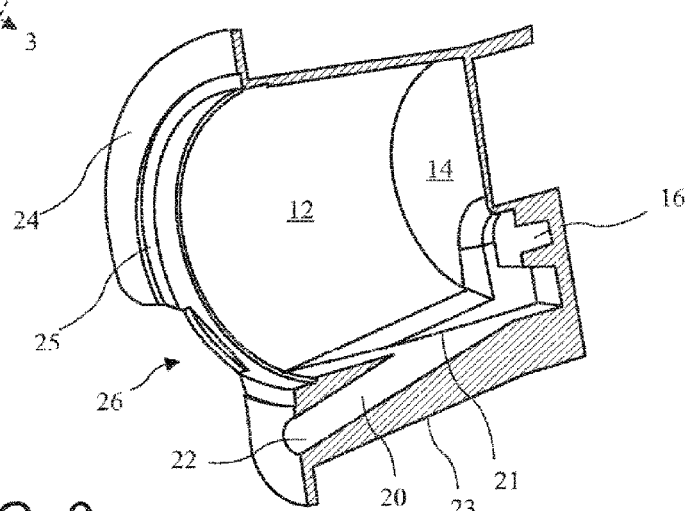
FIG. 3 is a cross-sectional view of an exemplary brewing cartridge adapter according to the present invention taken along line 3-3 of FIG. 2.

A bottom perspective view of the brewing cartridge adapter 10 is shown in FIG. 2 and a cross-sectional view of the brewing cartridge adapter 10 taken along line 3-3 of FIG. 2 is shown in FIG. 3. For use in particular known beverage brewers, the brewing cartridge adapter 10 can have an overall height H of about 2.4 inches high, a rim 24 diameter D1 of about 2.5 inches, a wall top 12a outside diameter D2 of about 1.85 inches, and a base of the walls 12b outside diameter D3 of about 1.55 inches, although these dimensions can assume any value and relative proportions. The brewing cartridge 40 (see FIGS. 8A and 8B) can rest on the shelf 25 to position the brewing cartridge 40 in the brewing cartridge adapter 10.

Figure 4:
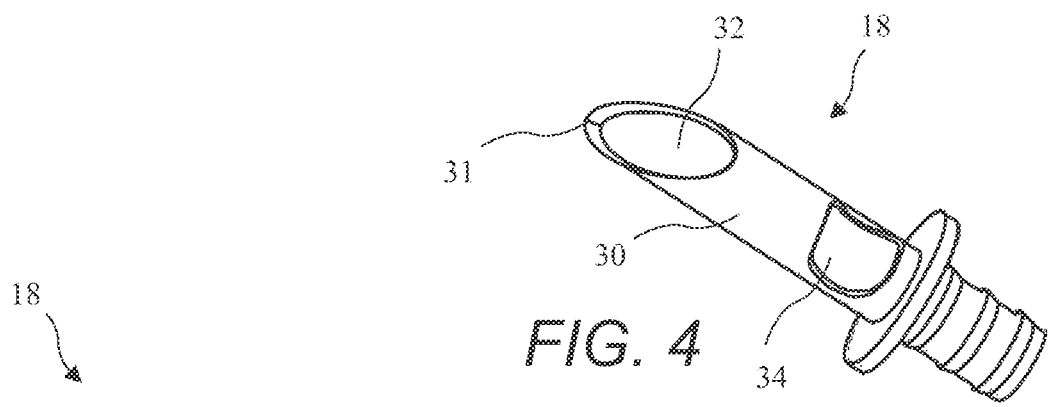
FIG. 4 is a perspective view of an exemplary extraction needle according to the present invention.
Figure 5:
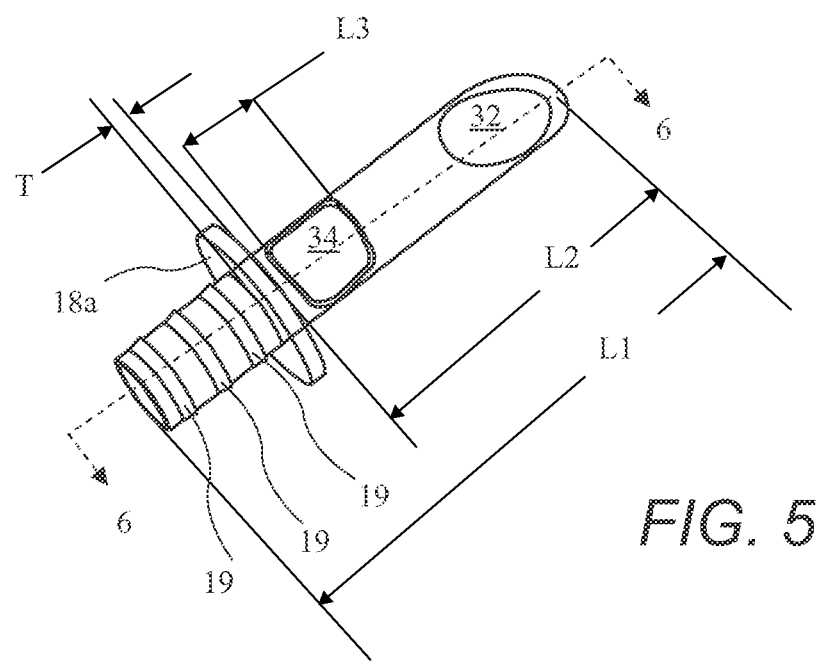
FIG. 5 is another perspective view of an exemplary extraction needle according to the present invention.
Figure 6:
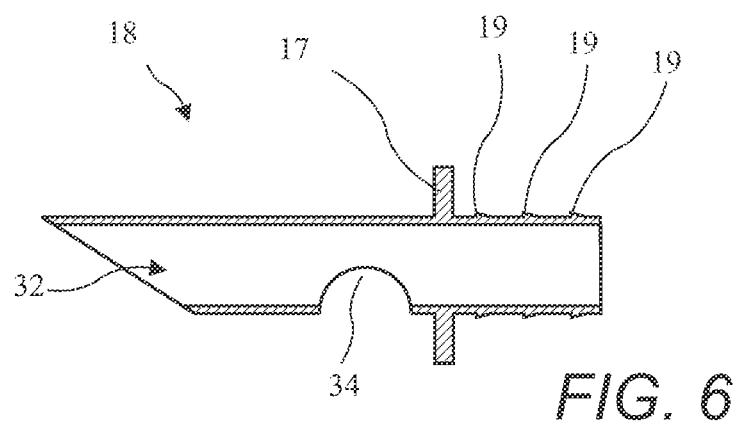
FIG. 6 is a cross-sectional view of an exemplary extraction needle according to the present invention taken along line 6-6 of FIG. 5.

A perspective view of the adapter extraction needle 18 is shown in FIG. 4, a second perspective view of the adapter extraction needle 18 is shown in FIG. 5, and a cross-sectional view of the adapter extraction needle 18 taken along line 6-6 of FIG. 5 is shown in FIG. 6. The adapter extraction needle 18 couples within the extraction needle cavity 16 of the brewing cartridge adapter 10, and preferably includes a flange 17 for seating against the floor 14 of the brewing cartridge adapter 10. The coupling mechanism can include, for example, barbs 19 for retaining the adapter extraction needle 18 in the brewing cartridge adapter 10 to allow a snap- or friction-fit. Those skilled in the art will recognize that there are various ways to retain the adapter extraction needle 18 within the extraction needle cavity 16, for example, by an arrangement for providing an interference fit or a threaded fit, through the use of an adhesive, by welding, and the like, and an adapter extraction needle 18 coupled to the brewing cartridge adapter 10 using any method or mechanism is intended to be included within the scope of the present invention.

The adapter extraction needle 18 includes a shaft 30 with a point 31 to puncture the disposable brewing cartridge 40, and a hollow interior that provides a conduit for the flow of liquid. Brewed beverage from the disposable brewing cartridge 40 enters the adapter extraction needle 18 through a mouth 32 and is released into brewing cartridge adapter 10 through the side passage 34. In an exemplary embodiment, the adapter extraction needle 18 has an overall length L1 of about 0.9 inches and the shaft 30 has a length L2 of about ⅝ inches. In this exemplary embodiment, the flange 17 has a thickness T of about 0.3 inches, and the side passage 34 has a length L3 of about 0.15 inches. These dimensions, however, can assume any value and relative proportions to suit the particular application.

Figure 7A:
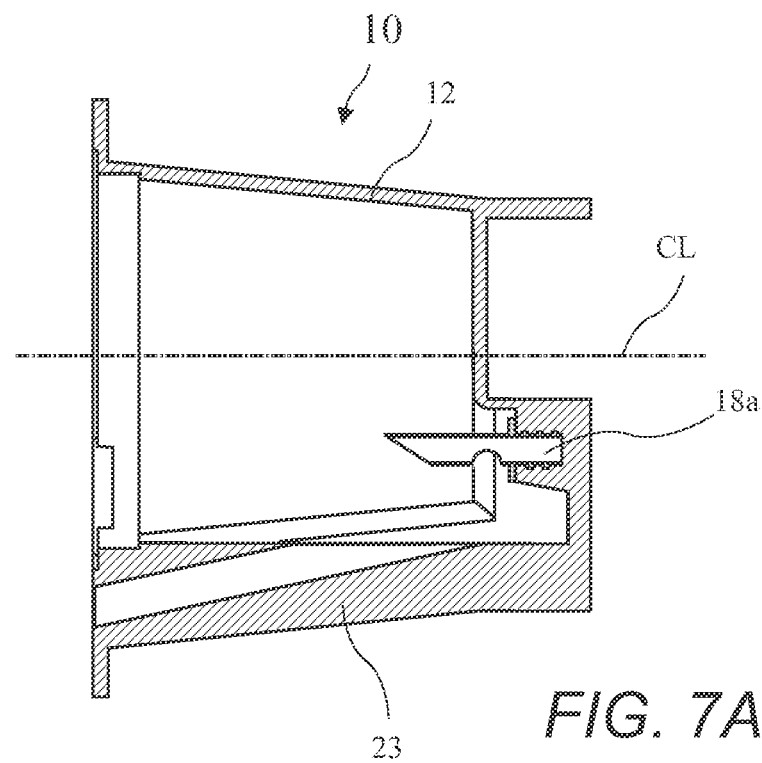
FIG. 7A is a cross-sectional view of an exemplary brewing cartridge adapter having a first embodiment of the extraction needle according to the present invention taken along line 3-3 of FIG. 2.
Figure 7B:
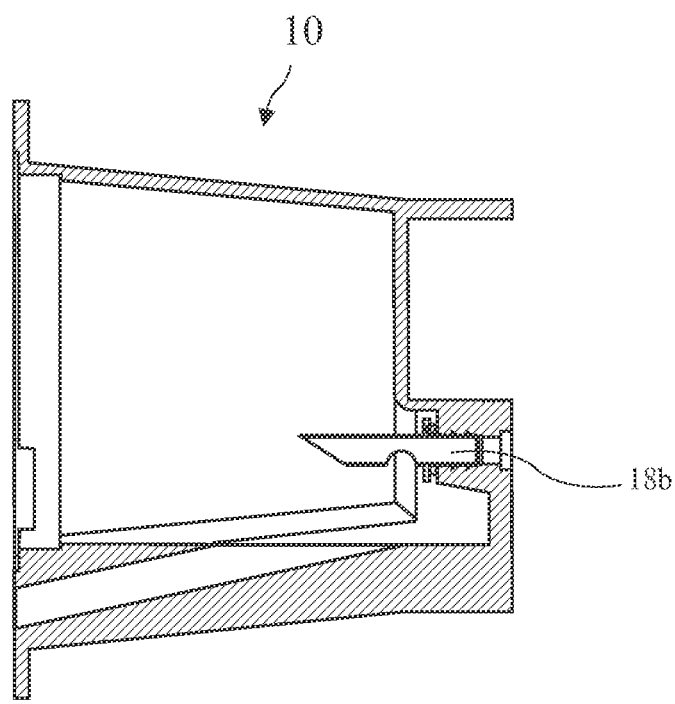
FIG. 7B is a cross-sectional view of an exemplary brewing cartridge adapter having a second embodiment of the extraction needle according to the present invention taken along line 3-3 of FIG. 2.

For example, a cross-sectional view of the brewing cartridge adapter 10 taken along line 3-3 of FIG. 2 is shown in FIG. 7A, in which the adapter extraction needle 18a is a threaded extraction needle held in the brewing cartridge adapter 10 by a mating threaded engagement with corresponding threads in the extraction needle cavity 16. A cross-sectional view of an alternative exemplary embodiment of the brewing cartridge adapter along line 3-3 of FIG. 2 is shown in FIG. 7B, in which the extraction needle 18b is a barbed extraction needle held in the brewing cartridge adapter 10 by barbs mating with a corresponding surface in the extraction needle cavity 16. Those skilled in that will recognize that an adapter extraction needle may be attached to the brewing cartridge adapter 10 in any of various ways, and an adapter extraction needle attached to the brewing cartridge adapter 10 in any manner is contemplated as being included within the scope of the present invention.

The wall 12 is preferably frusto-conical in shape, and generally radially symmetric about a centerline CL. A passage wall 23 enclosing the passage 20 extends outside the wall 12.

Figure 8A:
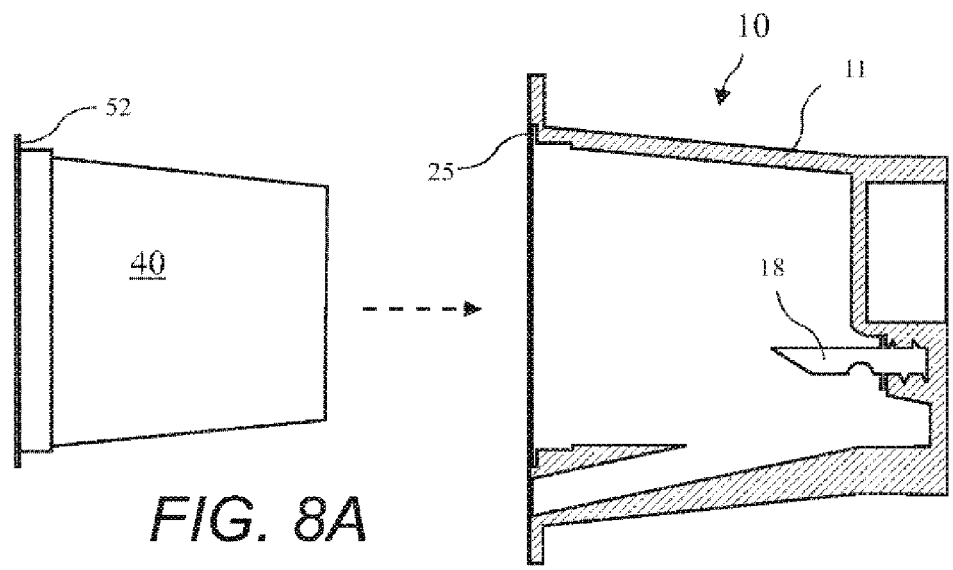
FIG. 8A is a cross-sectional view of an exemplary disposable brewing cartridge for insertion into the cartridge adapter according to the present invention.
Figure 8B:
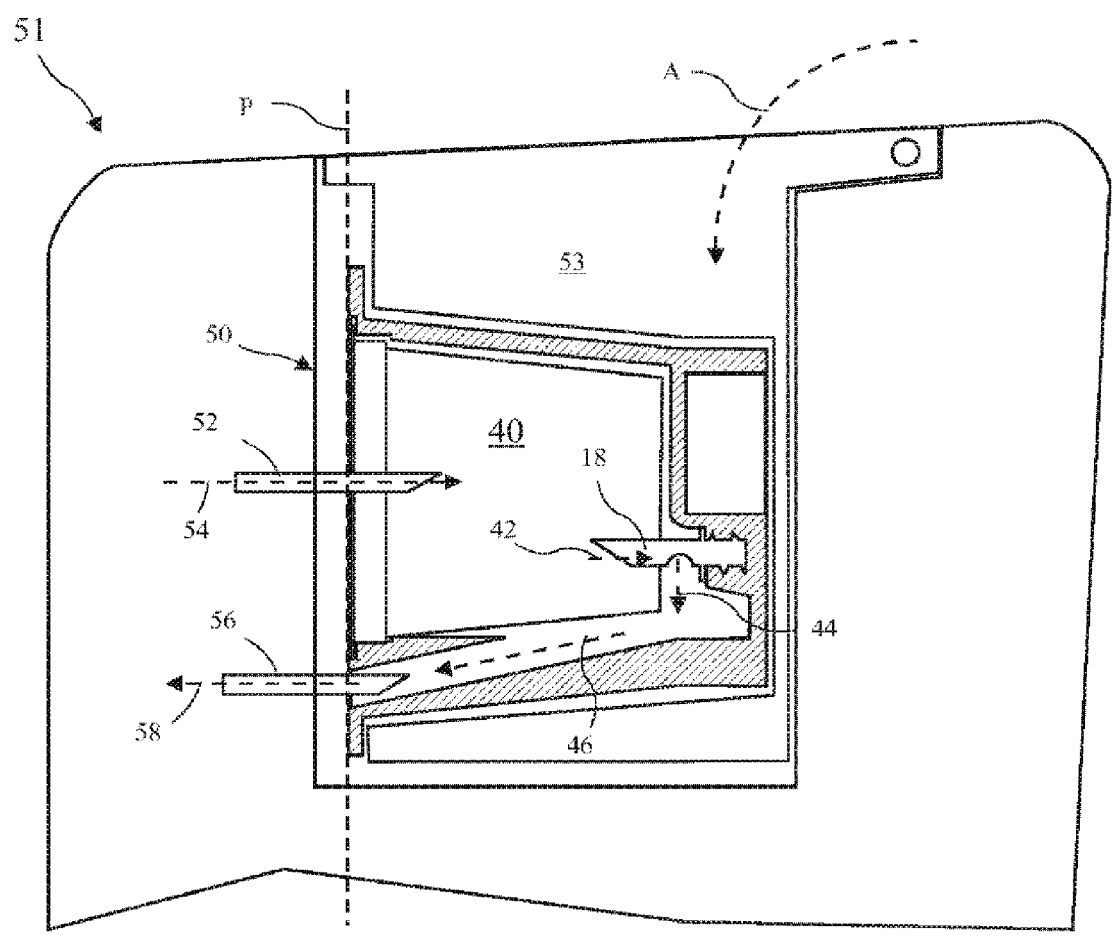
FIG. 8B is a cross-sectional view of an exemplary disposable brewing cartridge disposed in the cartridge adapter in a brewing chamber of a horizontally-oriented beverage brewer according to the present invention.

A cross-sectional view of a disposable brewing cartridge 40 is shown in FIG. 8A, positioned for insertion into the cartridge adapter 10. A cross-sectional view of a disposable brewing cartridge 40 disposed in the cartridge adapter 10 in a horizontal brewing chamber 50 of a beverage brewer 51 is shown in FIG. 8B. The disposable brewing cartridge 40 includes a rim 52, which is supported by the shelf 25 to position the disposable brewing cartridge 40 in the cartridge adapter 10. The brewing cartridge 40 is supported by a pivoting carrier 53 which is rotated about arc A to insert and remove the brewing cartridge 40 from the coffee maker 51.

An injection needle 52 of the coffee maker 51 passes through a plane P defined by the top of the of the brewing cartridge adapter 10, pierces the top of the disposable brewing cartridge 40, and injects liquid 54 into the disposable brewing cartridge 40. The extraction needle 18 punctures the bottom of the cartridge 40 and brewed beverage 42 created in the disposable brewing cartridge 40 flows into the extraction needle 18. The brewed beverage 44 flows from the side passage 34 (see FIG. 6) into the cartridge adapter 10. The brewed beverage 46 then flows through the passage 20 to the top of the cartridge adapter 10 and out 58 through an extraction needle 56 of the coffee maker 51, also passing through the plane P.

Figure 9:
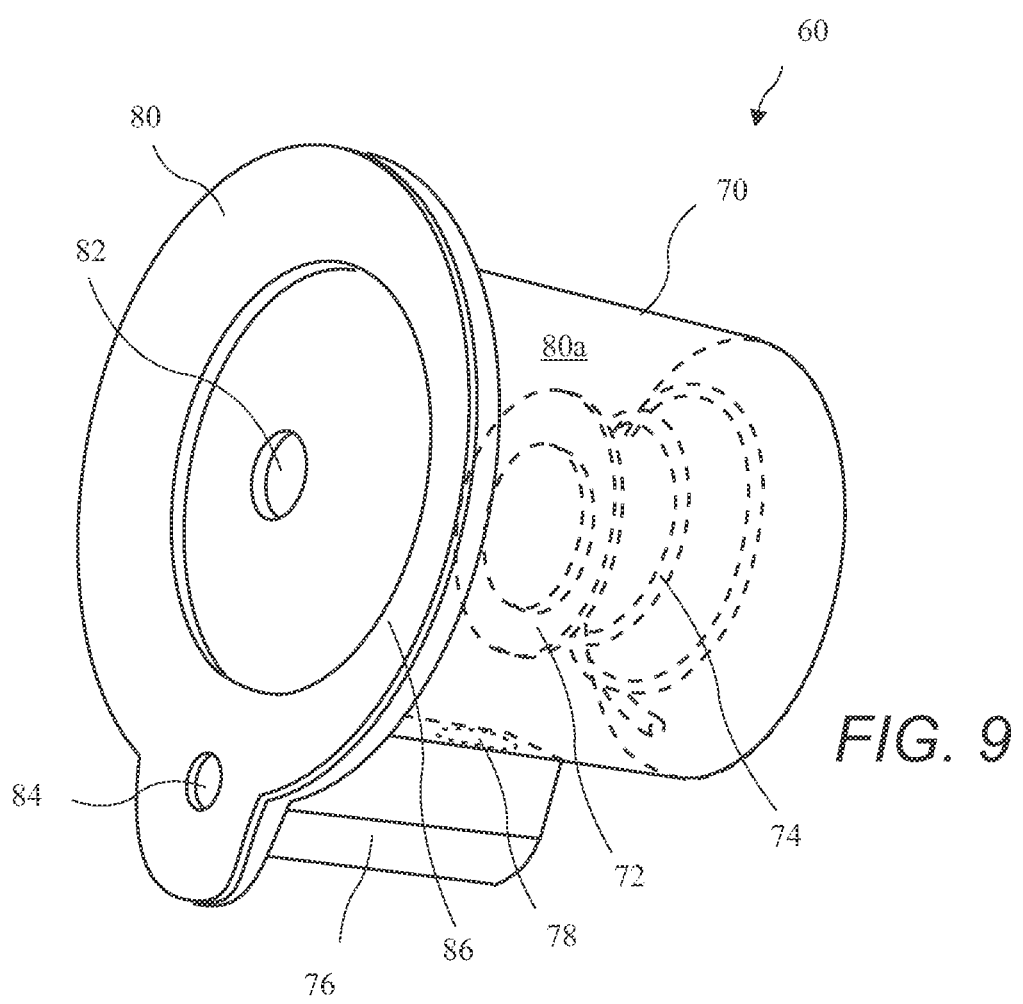
FIG. 9 shows an exemplary reusable brewing material holder according to the present invention.
Figure 10A:
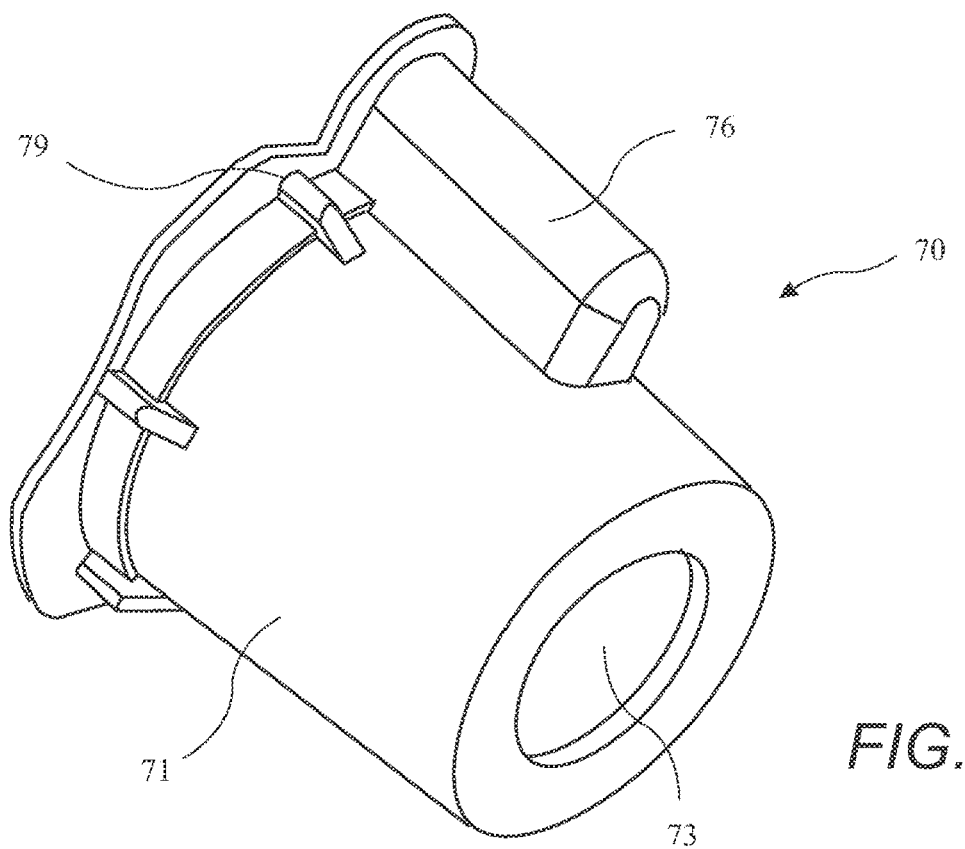
FIG. 10A is a side and bottom perspective view of an exemplary holder base of the reusable brewing material holder according to the present invention.
Figure 10B:
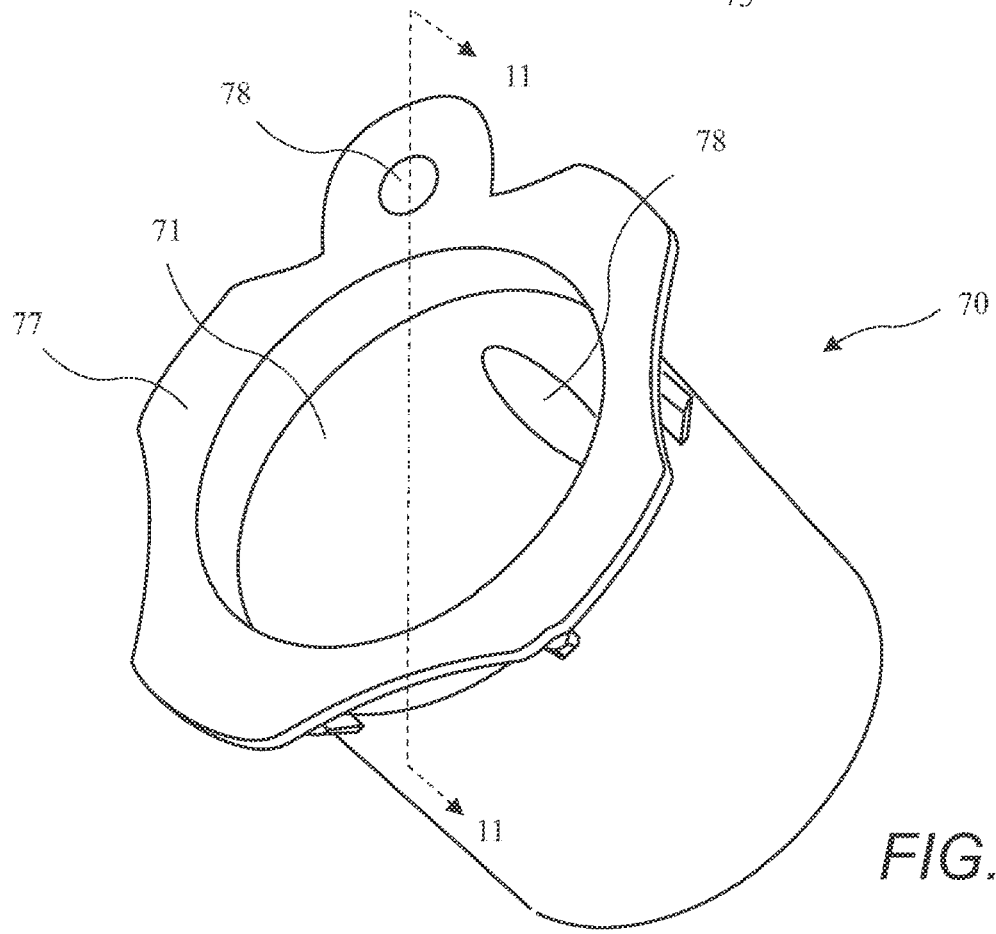
FIG. 10B is a side and top perspective view of an exemplary holder base of the reusable brewing material holder according to the present invention.

A perspective view of a brewing cartridge including a brewing material holder 60 according to the present invention is shown in FIG. 9, a side and bottom perspective view of a holder base 70 of the brewing material holder 60 is shown in FIG. 10A, a side and top perspective view of the holder base 70 of the brewing material holder 60 is shown in FIG. 10B, and a cross-sectional view of the brewing material holder according to the present invention taken along line 11-11 of FIG. 10B is shown in FIG. 11. The brewing material holder 60, which preferably is reusable, includes the base 70 and a lid 80. The lid 80 includes a centered injection hole 82 and an offset extraction hole 84. An O-Ring 87 (see FIG. 12B) helps form a seal between the base 70 and the lid 80. A tamping pad 72 is arranged inside the brewing material holder 60 supported by a tamping spring 74.

The holder base 70 includes a base wall 71 extending from a floor 73 and an interior 70a defined by the floor 73 and the wall 71. A base lip 77 forms a close path at the top of the wall 71. The holder base 70 includes a passage wall 76 defining an extraction passage 78 that couples a holder base interior 80a in fluid communication with the offset extraction hole 84 in the holder lid 80, providing a path for brewed beverage to flow from the brewing material holder 70 into a brewing chamber. A clearance space 78a is defined overlapping the extraction passage 78 and extending into the holder base 70 providing clearance for a beverage brewer extraction needle 56 (see FIG. 15). The bottom of the base 70 includes lower tamping spring retaining clips 79 for retaining the tamping spring 74 in the base 70.

A perspective top view of the holder lid 80 for the reusable brewing material holder 60 is shown in FIG. 12A and a perspective bottom view of the holder lid 80 is shown in FIG. 12B. The holder lid extraction hole 84 is preferably at least 0.22 inches in diameter to provide clearance for the extraction needle 56 (see FIG. 15) of the beverage brewer, although any size extraction hole 84 suitable for a particular application is contemplated. The bottom of the lid 80 includes a lid lip 88 forming a closed path around a sealing ring 86 and resting against the base lip 77 in an assembled reusable brewing material holder 60. The lid sealing ring 86 is a generally cylindrical ring and extends from the lid lip 88 into the interior 70a of the base 70, and preferably forms an interference fit to a top edge of the base wall 71. The lid sealing ring 88 preferably includes an O-Ring groove in which resides an O-ring 87. In alternative embodiments, the lid can be attached to the base by cooperating threads on the lid and base, by one or more hooks extending from the lid or from the base, and the like, and any reusable brewing material holder according to the present invention having a mechanically attachable lid that is, not attached by an adhesive), which lid is detachable and re-attachable without repairing damage to the lid or altering the lid, is contemplated to be included within the scope of the present invention. The lid 80 preferably is attached to the base 70 solely by features of the lid and the base.

The lid 80 includes at least one alignment feature for aligning the lid 80 with the base 70. Examples of alignment features are a first lid alignment lip 88a around the offset extraction hole 84 and a second lid alignment lip 88b, preferably opposite to the first lid alignment lip 88a, projecting from the lid lip 88 and cooperating with the base 70 to position the lid 80 on the base 70. The lid alignment lips 88a and 88b are spaced apart from the lid sealing ring 88 by at least the width of the base lip 77, allowing the lid lip 88 to rest against the base lip 77.

Figure 13A:
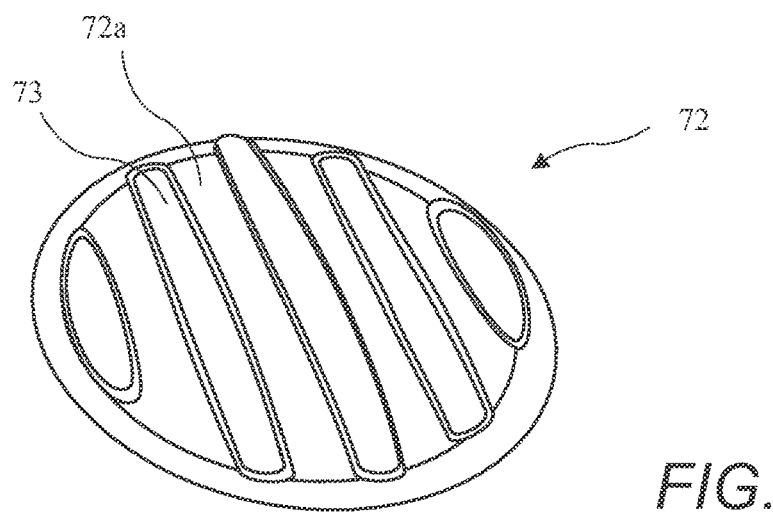
FIG. 13A is a top view of an exemplary tamping pad of the reusable brewing material holder according to the present invention.
Figure 13B:
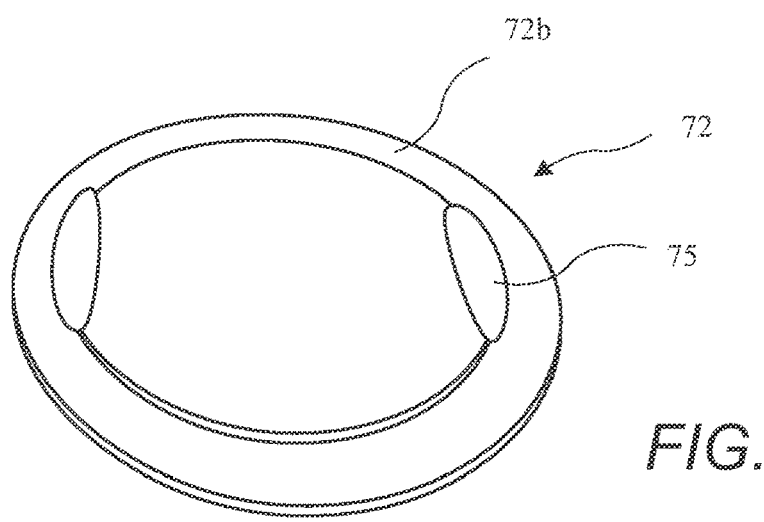
FIG. 13B is a bottom view of an exemplary tamping pad of the reusable brewing material holder according to the present invention.
Figure 14:
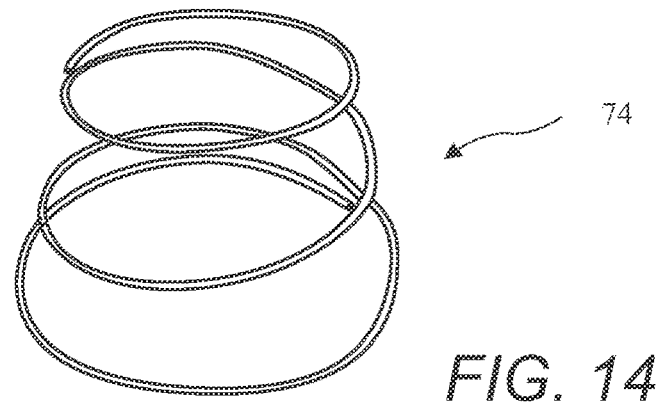
FIG. 14 is an exemplary tamping spring of the reusable brewing material holder according to the present invention.

A top view of the tamping pad 72 of the reusable coffee holder 60 is shown in FIG. 13A, a bottom view of the tamping pad 72 is shown in FIG. 13B, and the tamping spring 74 of the reusable coffee holder 60 is shown in FIG. 14. The tamping pad 72 preferably includes liquid flow ribs 73 on a top surface 72a to provide paths for brewed beverage, and upper tamping spring retention clips 75 on a bottom surface 72b to attach the tamping spring 74 to the tamping pad 72. The tamping spring 74 engages the lower tamping spring retention clips 79 (see FIG. 11) and the upper tamping spring retention clips 75, to retain the tamping pad 72 in the base 70.

Figure 15:
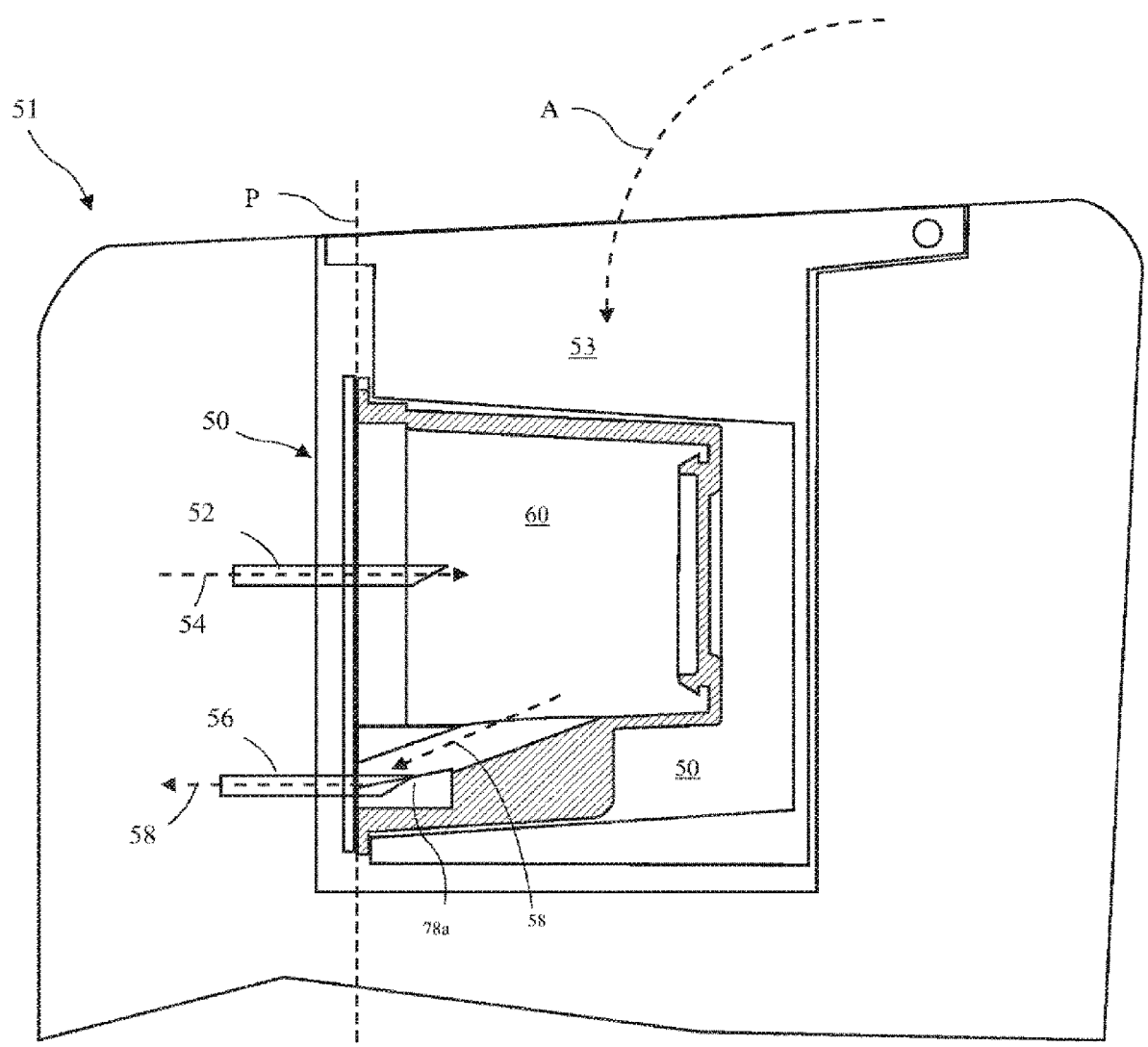
FIG. 15 shows an exemplary reusable brewing material holder according to the present invention disposed in a beverage brewer.

The reusable brewing material holder 60 is shown in the brewing chamber 50 of the beverage brewer 51 in FIG. 15. The injection needle 52 passes through the plane P defined by the top of the of the holder base 70 and enters the brewing material holder 60 through the centered injection hole 82, and the extraction needle 56 enters the brewing material holder 60 through the offset extraction hole 84. The offset extraction hole 84 also passes through the plane P and extends into the clearance space 78a to avoid contact or damage to the brewing material holder 60.

The brewing cartridge adapter 10 and the brewing material holder 60 are preferably made from plastic and are preferably reusable. The lid 80 can be a single-use foil or similar material attached to the base 70 by adhesive, or can be a reusable plastic or similar material lid mechanically attachable and detachable to the base 70. The reusable lid can include permanent openings for the coffee maker injection needle 52 and extraction needle 56.

While the invention herein disclosed has been described by means of specific embodiments and applications thereof, numerous modifications and variations could be made thereto by those skilled in the art without departing from the scope of the invention set forth in the claims.

I claim:

1. A brewing cartridge adapter for use in a beverage brewer, the brewing cartridge adapter comprising:
   a base, including:
      a floor; and
      a base wall extending from the floor and having an outer edge opposite the floor;
      wherein the floor, base wall, and outer edge define an enclosed interior of the base;
   a passage wall arranged outside the base wall and defining an enclosed extraction passage, wherein the passage wall is closed at a bottom and extends to a permanently open outlet port proximal to the outer edge of the base wall; and
   an entry port arranged between the extraction passage and the base interior, wherein the extraction passage is arranged in fluid communication with the base interior through the entry port, and in fluid communication with an exterior of the base through the outlet port, wherein at least a portion of the extraction passage is separated from the base interior by the base wall at the outer edge of the base wall;
   wherein the outlet port is arranged in a plane defined by the outer edge of the base wall.

2. The brewing cartridge adapter of claim 1, further comprising a hollow adapter extraction needle configured to be coupled in the floor of the base in fluid communication with the extraction passage such that the adapter extraction needle extends from the floor into the base interior, wherein the extraction needle includes a side passage providing fluid communication between an interior of the extraction needle and the extraction passage.

3. The brewing cartridge adapter of claim 2, wherein:
   the base includes a shelf at the outer edge configured to support a rim of a brewing cartridge; and
   the adapter extraction needle is configured to puncture the brewing cartridge.

4. The brewing cartridge adapter of claim 1, wherein the base is configured to receive a brewing cartridge having a top diameter of about 1.8 inches, a height of about 1¾ inches, and a bottom diameter of about 1.45 inches.

5. The brewing cartridge adapter of claim 1, wherein the base wall is frustoconical in shape.

6. The brewing cartridge adapter of claim 1, further comprising a lid that is removably couplable to the base.

7. The brewing cartridge adapter of claim 6, wherein the lid is composed of a disposable material.

8. The brewing cartridge adapter of claim 7, wherein the lid is attached to the base by an adhesive.

9. The brewing cartridge adapter of claim 6, wherein the lid is composed of a reusable material.

10. The brewing cartridge adapter of claim 9, wherein the lid is couplable to the base by mechanical cooperation of the lid and base.

* * * * *